Figure 1:
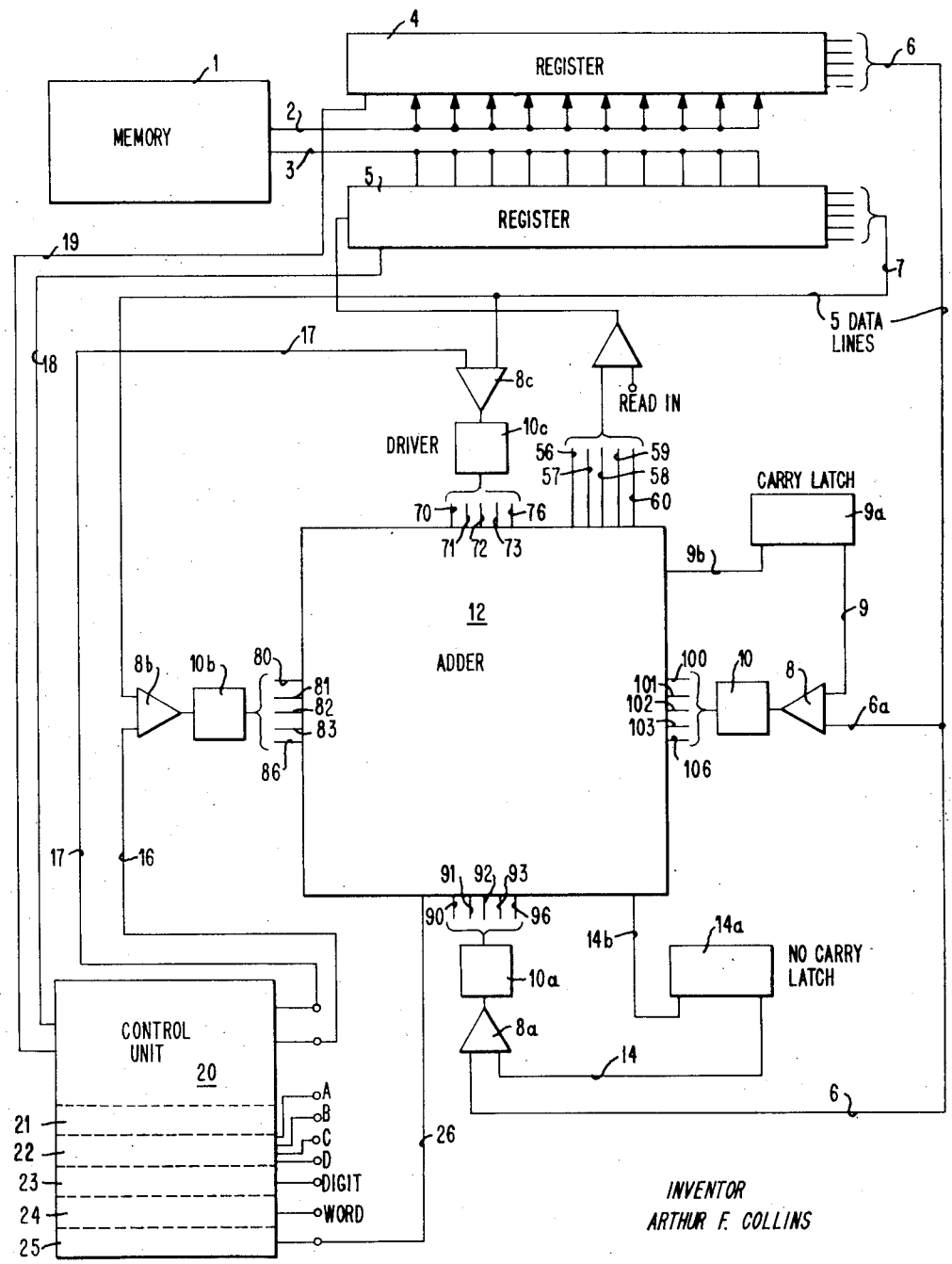

INVENTOR
ARTHUR F. COLLINS

Aug. 8, 1961   A. F. COLLINS   2,995,303
MATRIX ADDER
Filed Oct. 20, 1958                                    5 Sheets-Sheet 2

Aug. 8, 1961    A. F. COLLINS    2,995,303
MATRIX ADDER
Filed Oct. 20, 1958    5 Sheets-Sheet 4

Aug. 8, 1961  A. F. COLLINS  2,995,303
MATRIX ADDER
Filed Oct. 20, 1958  5 Sheets-Sheet 5

BIT VALUES

| DECIMAL VALUES | CARRY | | TRUE | | NO CARRY | | COMP | |
|---|---|---|---|---|---|---|---|---|
| 0 | | | 1 | 2 | 1 | 2 | 3 | 6 |
| 1 | 1 | 2 | 0 | 1 | 0 | 1 | 2 | 6 |
| 2 | 0 | 1 | 0 | 2 | 0 | 2 | 1 | 6 |
| 3 | 0 | 2 | 0 | 3 | 0 | 3 | 0 | 6 |
| 4 | 0 | 3 | 1 | 3 | 1 | 3 | 2 | 3 |
| 5 | 1 | 3 | 2 | 3 | 2 | 3 | 1 | 3 |
| 6 | 2 | 3 | 0 | 6 | 0 | 6 | 0 | 3 |
| 7 | 0 | 6 | 1 | 6 | 1 | 6 | 0 | 2 |
| 8 | 1 | 6 | 2 | 6 | 2 | 6 | 0 | 1 |
| 9 | 2 | 6 | 3 | 6 | 3 | 6 | 1 | 2 |
| 10 | 3 | 6 | | | | | | |

United States Patent Office 2,995,303
Patented Aug. 8, 1961

2,995,303
MATRIX ADDER
Arthur F. Collins, Vestal, N.Y., assignor to International
Business Machines Corporation, New York, N.Y., a
corporation of New York
Filed Oct. 20, 1958, Ser. No. 768,204
5 Claims. (Cl. 235—176)

The invention relates to core matrices and, more specifically, to a core matrix capable of performing arithmetic processes on groups of signals representing digital information; core matrices of this type being generally classified under adders.

In general, adders of the prior art are of the type in which selection of a core is achieved upon the coincident switching of selection currents. One of the major disadvantages of this selection system lies in the fact that wide variations in component tolerances cannot be tolerated and that the selection currents must be closely regulated; thus necessitating high tolerance standards for the components and for the control of the selection currents.

An object of the present invention resides in providing an adder matrix in which the above disadvantages are obviated.

Another object of the present invention resides in an adder matrix having a novel selection scheme for selecting a core by the absence of selection currents.

Yet another object resides in the simplicity and economy obtained by reason of the novel switching concept in an 11 x 10 matrix.

Another object of the invention provides for inherent translation to decimal representation.

The invention, in general, contemplates an arrangement of cores assembled in a geometrical pattern which, for convenience, may be a plane having columns and rows designated by decimal values 0–10 and 0–9, respectively; thus providing an 11 x 10 matrix. Each core in the matrix is threaded with a plurality of control windings according to a desired combinatorial code. The windings are connected to appropriate input drive lines to which signals representing coded data are applied. In the preferred embodiment, the input data is represented in 2 out of 5 code form in which the bit values are weighted 0, 1, 2, 3, 6. The invention need not, however, be limited to this code form since any other code form representation may be employed. As will be more fully explained hereinafter, the appropriate sets of windings are uniquely arranged on each core of the matrix so as to provide for an inherent translation to decimal from the 2 out of 5 code form and to provide for a savings in the number of cores employed.

The unique arrangement, together with various gates and control signals, provide for selecting a desired core within the matrix by the absence of current, as opposed to the coincident switching of currents scheme characteristic of the adders of the prior art. The type of core employed is one having substantially rectangular hysteresis characteristics.

In its various arithmetic operations, the adder is controlled to provide a sum for each operation involving the entry of two quantities. For each such operation, entries are effected by way of appropriate drive lines to two out of four control windings; namely, true, complement, carry, and no carry; one entry being made by either the true or complement windings and the other entry by way of the carry or no-carry windings. The sum of the two input values is arrived at upon the selection of a core which lies at the intersection of a selected column and a selected row of cores in the adder matrix. Just prior to the entry of the two values, all cores of the matrix are driven into a saturated "1" state of remanence. Upon transmission of the two values to the adder matrix, all cores will be maintained in this saturated "1" state except for the core representing the sum of the two values (this being designated as the selected core); the selected core being permitted to assume a relaxed "1" state when the driving currents to said core are cut off or inhibited. It is this absence of currents to the adder at this time that provides for the selection of the core in question on a no-current basis. Next in this operation, a read out sample signal is applied to all the cores in the matrix, the magnitude of this signal being less than the magnitude of the driving currents, maintaining all cores except the selected core in the unsaturated "1" state, but of sufficient magnitude to drive the relaxed core to a reverse or "0" state. All other cores at this time merely assume a lesser degree of saturation in the "1" state. During reversal of the selected core, the latter provides an output from its associated sense output windings while the remaining unselected cores exhibit no such output from their associated output sense windings. Finally, the matrix is restored by energizing, or driving, all cores including the one selected to the "1" state.

Another unique feature of the invention lies in the 11 x 10 size of the matrix. In some of the prior art adders, the cores are arranged in planes, each of an 10 x 10 size. However, in these adders, at least two such planes are required, thus requiring almost twice the number of cores employed in the 11 x 10 matrix of the present invention. The function of this additional column of cores in the 11 x 10 matrix will be described later on at a more appropriate time.

Other objects of the invention will be pointed out in the following description and claims and illustrated in the accompanying drawings, which disclose, by way of examples, the principle of the invention and the best mode, which has been contemplated, of applying that principle.

Figure 10:
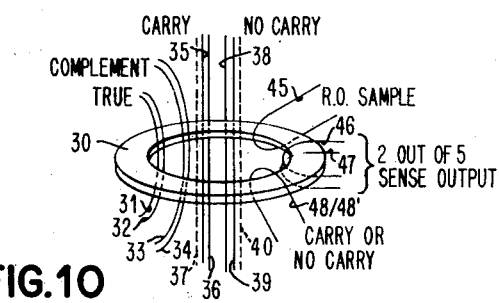
Figure 2E:
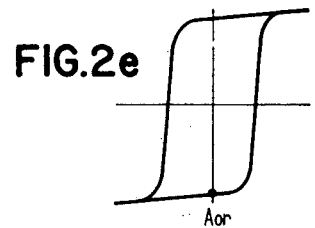
Figure 4:
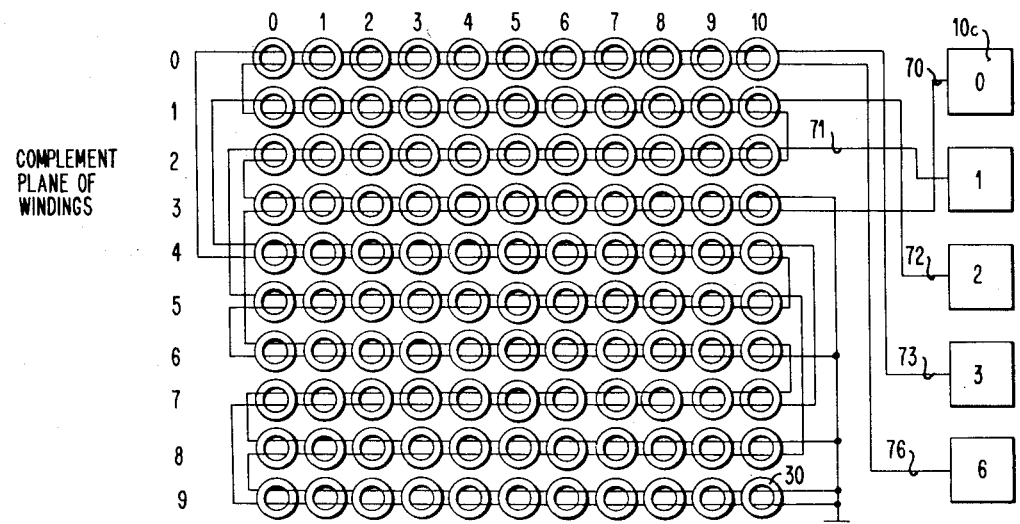
Figure 5:
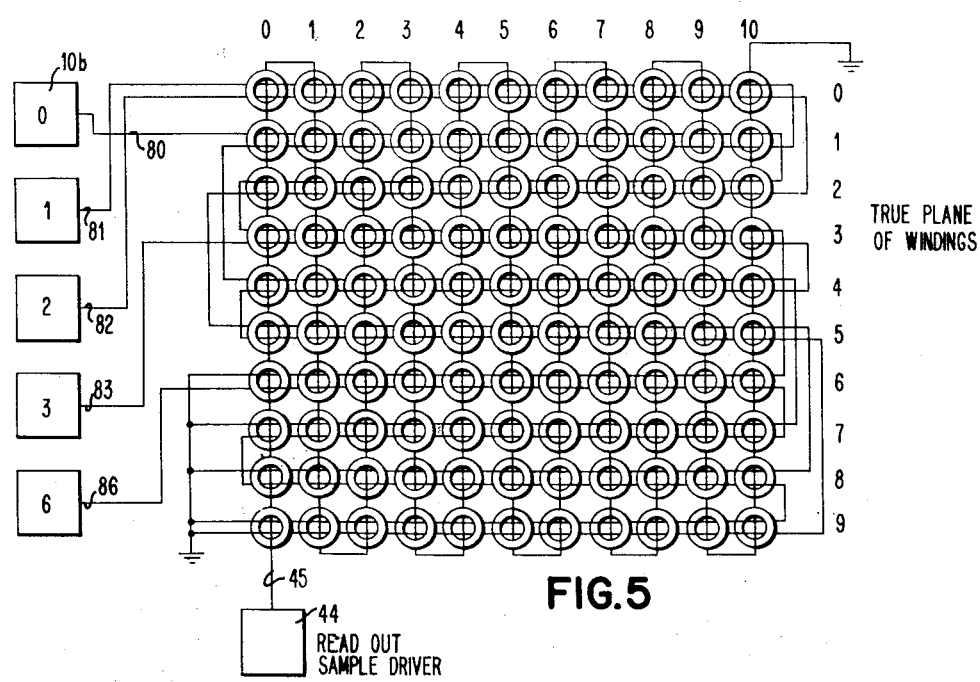
Figure 6:
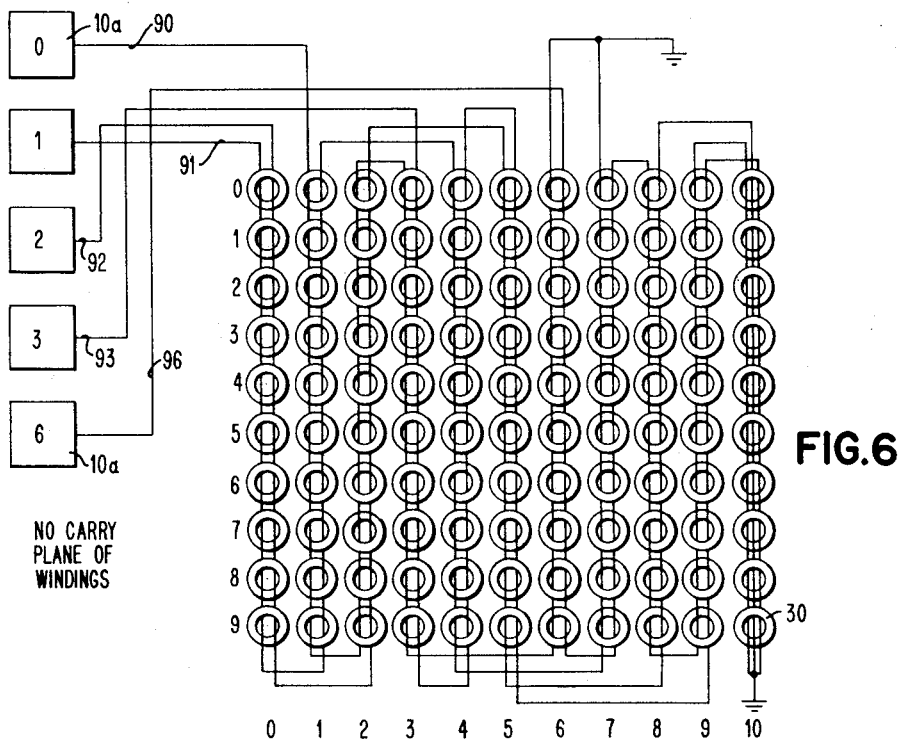
Figure 7:
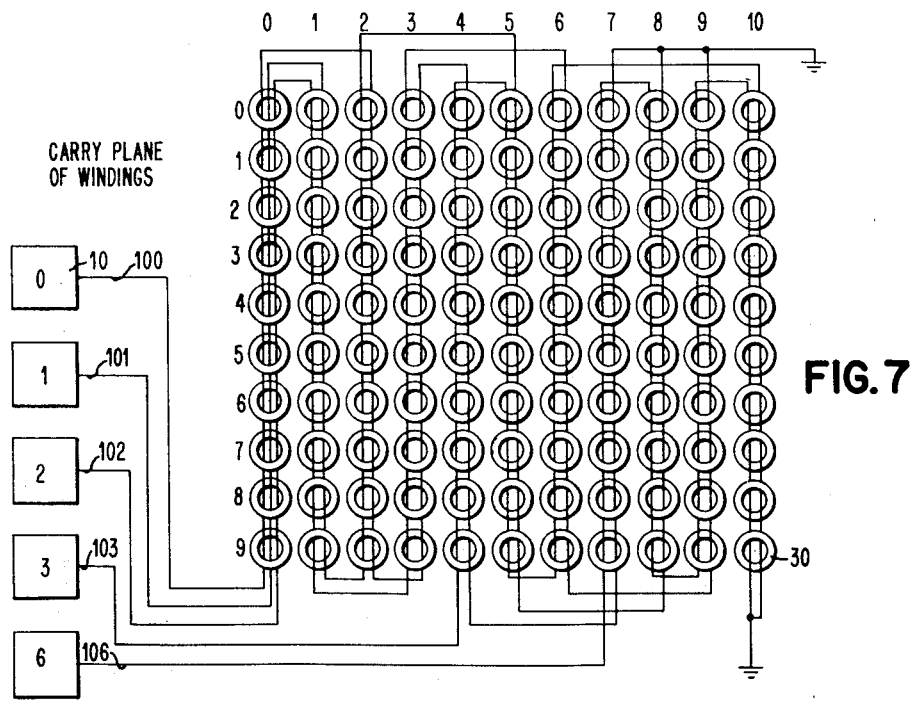
Figures 8, 9:
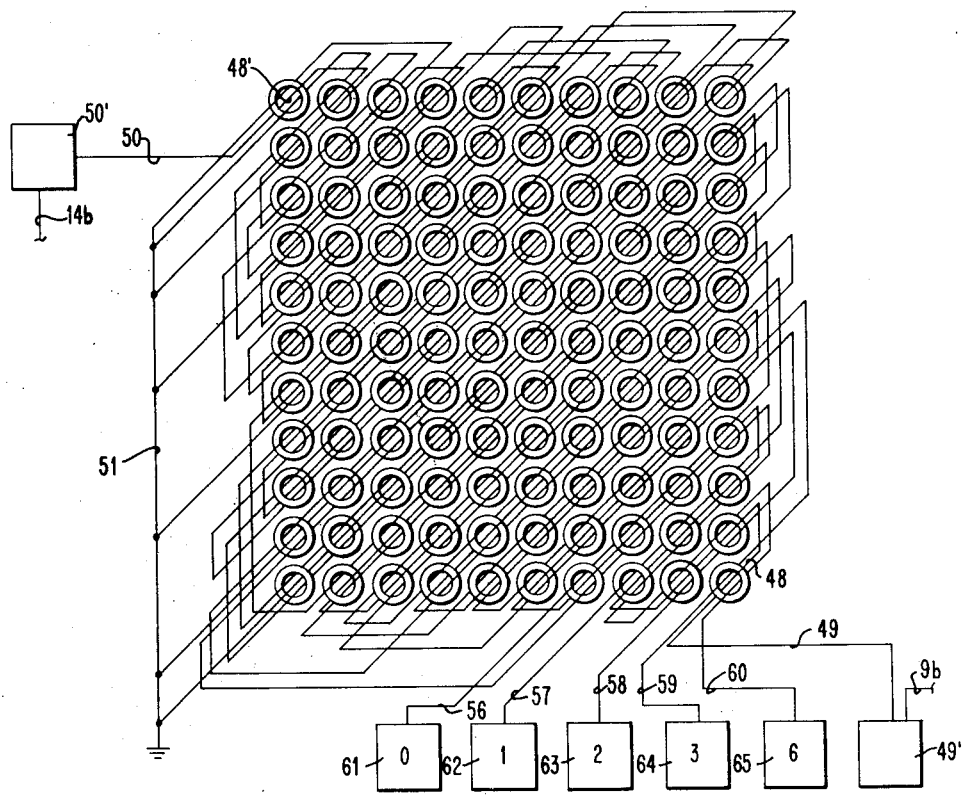

In the drawings:
FIG. 1 is a schematic drawing of a computing or data processing system showing, in block form, the position of the adder within the system.
FIG. 2 and FIGS. 2a through 2e show the hysteresis curves depicting the two different states of remanence and different degrees, or conditions, of these states for selected and unselected cores during a cycle of operation.
FIG. 3 is a time chart showing the relationship of the various gates, information, and timing signals employed to control the adder.
FIG. 4 shows the complement windings threaded throughout the adder matrix.
FIG. 5 shows the true windings threaded throughout the adder matrix.
FIG. 6 shows the no-carry windings threaded throughout the adder matrix.
FIG. 7 shows the carry windings threaded throughout the adder matrix.
FIG. 8 shows the sense output windings threaded throughout the adder matrix.
FIG. 9 is a time chart showing the bit composition for the decimal values associated with the various windings of the adder matrix.
FIG. 10 shows the various windings in a single core.

Figure 2:
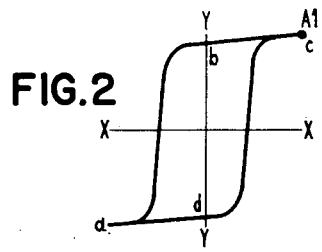
Figure 2A:
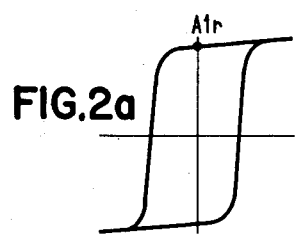
Figure 2B:
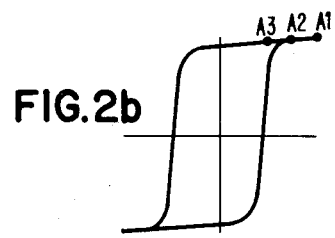
Figure 2C:
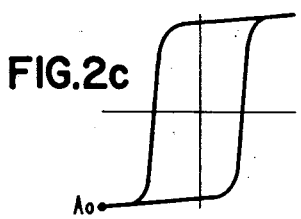
Figure 2D:
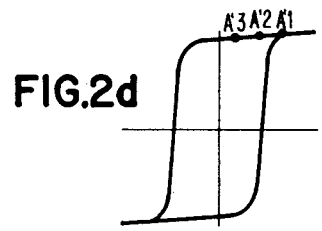
Figure 3:
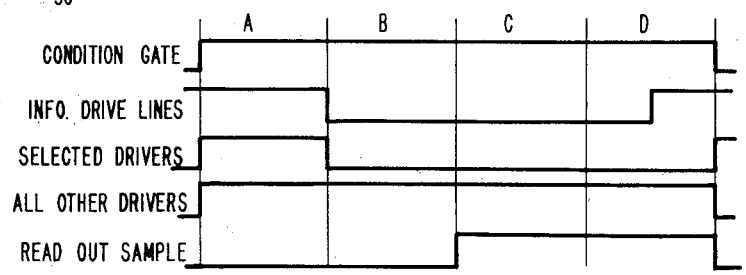

As a preliminary to an explanation of the details of the invention, it will be necessary to first describe the cores and their characteristics with the aid of FIGS. 2, 2a through 2e, and the time chart of FIG. 3 which shows the cycle of operation divided into four equal time intervals; namely, A, B, C, D. Within this time cycle are shown the basic timings for a condition gate, information gate, selected drive, all other gated drivers, and the read out sample driver. The cores are of the type which have a substantially rectangular hysteresis characteristic, or loop, enabling the core to assume one or the other of two states. In FIG. 2, for example, the hysteresis loop is defined by the curve abcda, with respect to axes X—X and Y—Y. Points b and d represent relaxed states of remanence corresponding to states "1" and "0," respectively. A dot $A_1$ is used to indicate the maximum degree of remanence or saturation of a core which is under the influence of a maximum driving force. Upon the expiration of this maximum driving force, the core relaxes to a state indicated by the position of dot $A_{1r}$ in FIG. 2a. In FIG. 2b, the positions $A_3$, $A_2$ and $A_1$ of three dots show respectively three different degrees of saturation assumed by cores influenced by driving forces of three different magnitudes. FIGS. 2c and 2d correspond to FIGS. 2a and 2b and illustrate the results obtained upon the application of a counter driving force of given magnitude to a core having the condition indicated in FIG. 2a and to the cores having the states indicated in FIG. 2b. The result of this applied counter driving force may be appreciated by the position of the dot $A_0$ shown in FIG. 2c, which position is indicative of a "0" state with maximum saturation. Upon expiration of this counter driving force, the selected core assumes a relaxed "0" state, as indicated by the position $A_{0r}$ of the dot shown in FIG. 2e. The effect of this counter driving force upon the cores considered in connection with FIG. 2b is that the cores are shifted to a lesser state of remanence, as shown by the position of the dots $A'_3$, $A'_2$ and $A'_1$ in FIG. 2d.

In conjunction with the chart of FIG. 3, the selected core in question is switched at the beginning of C time of the cycle under control of the read out sample driver. This same core is selected at B time under control of the absence of current as indicated by the downward shift in the level for the information line.

Before describing the nature of the four principal planes of windings threading the cores of the matrix, it might be desirable to briefly point out how these windings are threaded on a single core shown in FIG. 10. Here the core 30 is shown as having a pair of true windings 31, 32; a pair of complement windings 33, 34; a pair of carry windings 35, 36; and a pair of no-carry windings 38, 39. It may be observed in FIG. 10 that a third winding 37 and a third winding 40 are each shown in dotted form. These lines 37 and 40 are employed in only the extreme left and right columns of the matrix, as may be seen from an inspection of FIGS. 6 and 7. In FIG. 6, the last column has three no-carry windings instead of the usual two threading the cores in the remaining columns while FIG. 7 has three carry windings for each of the cores in the first column. The third winding in each of these columns enables selection of only a single core in the entire matrix in any operation wherein either carry or no-carry planes are being utilized. The uniqueness of this arrangement may be realized by the fact that otherwise it would be necessary to have either two separate distinct matrices, each of 10 x 10 size, to accommodate the carry and no-carry functions of a decimal type adder or a single plane requiring explicit translation means.

It may be appreciated that the pairs of windings described are employed to accommodate two bits out of the five possible bits of a 5-bit code. The invention may take other forms; for instance, instead of pairs of windings, a single winding of each control winding may be employed and the number of control windings may vary depending upon the particular requirements of a system. Moreover, the matrix may comprise any number of columns from as little as two to any practical number. The windings themselves may comprise but a single loop with all loops being connected so as to form a single continuous path which is then connected to a driving line, the other end of the winding being connected to an appropriate source of potential.

The four principal planes of windings; namely, complement, true, carry, and no carry, will now be described. Referring to FIG. 4, there is shown a complement plane of windings, which windings are threaded through eleven columns of cores, numbered 0–10 from left to right, and ten rows of cores, numbered 0–9 from top to bottom. The intersection of a designated column and row constitutes a selected core which represents in decimal notation the sum of the values of the designated column and row. For example, the intersection of column 3 and row 3 provides a core whose designated decimal value is 6. The complement windings passing through these decimally designated cores are threaded in the manner shown in FIG. 4, each core being threaded by two windings and each winding being connected to an appropriate one of five drive lines 70, 71, 72, 73 and 76 in turn driven by a particular one of the five bit drivers 10c; one for each of the bit values 0, 1, 2, 3, 6, constituting the 5-bit code. The complement bit composition for the decimal values 0–9 are shown in the chart of FIG. 9.

FIG. 5 shows the true plane of windings threaded through the same sets of cores shown in FIG. 4. Here in FIG. 5, the columns and rows of cores are designated in the same manner as in FIG. 4; and each core is driven by two sets of windings. This true plane of windings is connected to five drive lines 80, 81, 82, 83 and 86 in turn driven by an appropriate set of five bit drivers 10b. There is also seen in FIG. 5 a read out winding 45 which need not be described at this point since its purpose and function will be described in detail at a more appropriate time later on. An inspection of FIG. 9 will indicate the 2 out of 5 bit composition for the decimal values 0–9 which apply to the true plane of windings.

In FIGS. 6 and 7, respectively, there are shown the no-carry and the carry plane of windings threading the same plane of cores shown in FIGS. 4 and 5. The no-carry plane of windings is connected to five drive lines 90, 91, 92, 93 and 96 in turn driven by an appropriate set of five bit drivers 10a, one for each of the five bits of the code. In FIG. 7, the carry plane of windings is connected to five drive lines 100, 101, 102, 103 and 106 in turn driven by an appropriate set of five bit drivers 10, one for each of the five bits of the code.

In addition to the four windings just described, each core is threaded with the read out sample winding 45, earlier referred to in connection with FIG. 5. This winding 45 is driven by appropriate driving control means 44, shown in block form. This means 44 is operative at C and D times of the cycle, as indicated in the chart of FIG. 3, to drive a core from a relaxed "1" state to a "0" state. In addition, each core (FIGS. 10 and 8) is provided with two sense output windings 46, 47 to provide read out signals representing a sum in 2 out of 5 code form. The core shown in FIG. 10 is further provided with a winding identified as 48/48'. This is to indicate the fact that certain cores of the matrix will have a carry control winding while the remaining cores will have a no-carry control winding. Referring to FIG. 8, the carry control winding of each core is connected to a line 49 in turn connected to amplifying means 49', shown in block form, from which an amplified carry signal is issued along a line 9b to control the operations of a carry latch 9a shown in FIG. 1. Referring again to FIG. 8, the no-carry control winding 48' is connected to a line 50 in turn connected to amplifying means 50', similar to the means 49', which provides an output on a line 14b connected to a no-carry latch 14a, also seen in FIG. 1. Both lines 49 and 50 terminate at a common grounded line 51. The sense windings are connected to five output lines 56–60, each in turn connected to an appropriate one of five output means 61–65. The opposite ends of the lines 56–60 terminate at a grounded line 51.

An exemplary manner in which the adder cooperates with a data processing system may be explained with reference to FIG. 1, which shows the system in a diagrammatic sense. The system comprises, essentially, a high speed memory 1 having data distribution channels 2 and 3 connecting shift registers 4 and 5 to which information is supplied in parallel fashion. The information is issued from the registers 4 and 5 in a serial parallel manner; that is, serial by character and parallel by bit, the information being represented in 2 out of 5 code form, and passes along data channels 6 and 7, each shown as a single line; however, each is comprised of five lines to accommodate the 2 out of 5 code form. These channels 6 and 7 are adapted to convey the coded information to the adder here identified as a block 12. The adder 12, as earlier explained, comprises an array of cores arranged in a single plane and threaded with the four planes of control windings. Each of these windings is selectively controlled to receive the information transmitted over the channels 6 and 7 by means of appropriate controls, switches, and drivers now to be described. The channel 6 feeds a connecting channel 6a in turn connected to a switch 8 further controlled by a line 9 over which a carry signal is issued. This carry signal initially arises as a result of a carry generated from the sum produced by the adder. Upon a coincidence of signals to the switch 8, an output will be issued to a driver 10 to drive two of five lines 100-103 and 106 connected to the carry plane of winding. It might be appropriate to mention at this point that the switch 8 and the driver 10, as well as the switches and drivers associated with the other planes of windings, are shown as single elements. Actually, there are five switches and five drivers, one for each of the five lines constituting the channel 6a. In somewhat of a similar manner, the no-carry plane of windings is driven by channel 6 under the control of switch 8a and driver 10a; and, here as before, the switches and drivers are symbolically represented by single representations. The complement and true windings are driven respectively under control of five switches and five drivers represented by switch 8c and driver 10c and switch 8b and driver 10b. The switches 8b and 8c are gated by appropriate minus and plus gates issued along lines 16 and 17 connected to a control unit 20, the latter providing, among other signals, a minus and a plus signal selected under control of an appropriate add or subtract computer instruction. The control unit 20 also controls the operation of the shift registers 4 and 5 by means of appropriately timed signals transmitted through lines 18 and 19 to cause these registers to transmit data at the appropriate time in each cycle over the channels 6 and 7. The gating of switches 8 and 8a is controlled by appropriate carry and no-carry gate signals issued respectively by the carry latch 9a, connected to the adder by way of a line 9b, and the no-carry latch 14a, connected to the adder by way of line 14b. Also, associated with the control unit 20 is a timer unit 19 for coordinating the activities of the control unit with the system, a pulse timer 22 for issuing A, B, C, D pulses, and gate timers 23, 24 and 25 for issuing digit gates, word gates, and read out sample gates; the latter being applied to the adder by way of a line 26.

The output of the adder matrix may be switched, under control of an appropriately timed read in signal, to any receiving register; for example, register 5.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A bistable magnetic core having substantially rectangular hysteresis characteristics; first and second control windings for said core; means for applying, for a limited time interval, driving currents of a given magnitude to said windings to drive said core to a saturated first condition of stability, said core assuming a relaxed first condition of stability different from either of the first conditions of stability upon expiration of said driving currents at the termination of said interval; a read out sample winding; means for applying after the termination of said interval a reverse driving current, of a magnitude less than said given magnitude, to said read out sample winding to drive said core to a second condition of stability different from either of the first conditions of stability; and a sense output winding for issuing an output signal in response to a change in the condition of stability from said first relaxed condition to said second condition of stability.

2. A matrix comprising: a plurality of bistable magnetic cores having decimal significance according to position in the matrix; planes of windings threading said cores according to a desired combinatorial code; groups of drive lines, a group being connected to each plane of windings; means for selectively applying driving currents to two groups of said groups of drive lines to drive each of the cores to a saturated first condition of stability; means for selectively inhibiting the currents in two drive lines in each of the selected groups of drive lines to enable a core of a desired decimal significance to assume a relaxed first condition of stability; a read out sample winding threaded through each of said plurality of cores; means for applying a counter driving current to each sample winding to drive only the relaxed core to a second condition of stability; and sense output windings threading each core according to a desired combinatorial code related to the decimal significance of each core and adapted to provide coded output pulses, and the sense output windings associated with the relaxed core providing the appropriate coded output pulses as the relaxed core is driven to its second condition of stability.

3. A matrix comprising: a plurality of bistable magnetic cores having decimal significance according to position in the matrix; three planes of windings; namely, true, no carry, and carry threading said cores according to a two out of five code; three groups of drive lines, a group being connected to each plane of windings; means for selectively applying driving currents to two groups of said groups of drive lines to drive each of the cores to a saturated first condition of stability; means for selectively inhibiting the currents in two drive lines in each of the selected groups of drive lines to enable a core of a desired decimal significance to assume a relaxed first condition of stability; a read out sample winding threaded through each of said plurality of cores; means for applying a counter driving current to each sample winding to drive only the relaxed core to a second condition of stability; and sense output windings threading each core according to a desired combinatorial code related to the decimal significance of each core and adapted to provide coded output pulses, and the sense output windings associated with the relaxed core providing the appropriate coded output pulses as the relaxed core is driven to its second condition of stability.

4. A decimal matrix having carry and no-carry sections comprising: a plurality of cores each having carry or no-carry decimal significance depending upon section location; three planes of windings; namely, true, carry and no carry threading said cores according to a two out of five code; a carry control winding and a no-carry control winding for the carry and no-carry sections, respectively, including carry and no-carry selection control means controlled respectively by said carry and no-carry control windings depending upon which is effective; three groups of drive lines, each group containing five lines, and each group connected to an appropriate one of the three planes of windings; means for applying driving currents to a true group of drive lines and to either of the carry or no-carry groups of drive lines, depending upon whether the carry or the no-carry selection control means is operative, to drive each core to a saturated first condition of stability; means for selectively inhibiting the currents in appropriate two out of five lines in each of the groups of lines being driven, in accordance with values entered and represented in code form, to thereby enable a core, representing the decimal sum of the entered values, to assume a relaxed first condition of stability; a read out sample winding threaded through each core; sense output windings threading each core; and means for applying a counter driving current to each sample winding to drive only the relaxed core to a second condition of stability, the relaxed core sense output windings providing coded signals representing the sum of the entered values, and either the carry or no-carry winding becoming effective, depending upon the sectional location of the relaxed core, to control the appropriate one of the carry and no-carry selection control means.

5. An eleven by ten decimal matrix having carry and no-carry sections comprising: eleven columns 0–10 and ten rows 0–9 of cores, each core having carry or no-carry decimal significance depending upon section location; three planes of windings; namely, true, carry, and no carry threading said cores according to a two out of five code, the cores of the lowest and highest ordered columns being threaded respectively with an additional winding of the carry and no-carry planes of windings; a carry control winding and a no-carry control winding for the carry and no-carry sections, respectively, including carry and no-carry selection control means controlled respectively by said carry and no-carry control windings depending upon which is effective; three groups of drive lines, each group containing five lines, and each group connected to an appropriate one of the three planes of windings; means for applying driving currents to a true group of drive lines and to either of the carry or no-carry groups of drive lines, depending upon whether the carry or the no-carry selection control means is operative, to drive each core to a saturated first condition of stability; means for selectively inhibiting the currents in appropriate two out of five lines in each of the groups of lines being driven, in accordance with values entered and represented in code form, to thereby enable a core, representing the decimal sum of the entered values, to assume a relaxed first condition of stability, the cores in the lowest or highest ordered columns being prevented from assuming relaxed states, respectively, during the inhibition of currents in either the carry or no-carry planes of windings; a read out sample winding threaded through each core; sense output windings threading each core; and means for applying a counter driving current to each sample winding to drive only the relaxed core to a second condition of stability, the said relaxed core sense output windings providing coded signals representing the sum of the entered values, and either the carry or no-carry winding becoming effective, depending upon the sectional location of the relaxed core, to control the appropriate one of the carry and no-carry selection control means.

References Cited in the file of this patent

UNITED STATES PATENTS

| | | |
|---|---|---|
| 2,691,156 | Saltz et al. | Oct. 5, 1954 |
| 2,734,184 | Rajchman | Feb. 7, 1956 |

OTHER REFERENCES

Brean: Magnetic Matrix Switch Reads Binary Output, Electronics (May 1954), pages 157–159, page 158 relied on.